United States Patent [19]
Swift et al.

[11] Patent Number: 5,323,824
[45] Date of Patent: Jun. 28, 1994

[54] TIRE/VEHICLE SYSTEM

[75] Inventors: Douglas A. Swift, Hudson; John J. Taube, Tallmadge, both of Ohio

[73] Assignee: The Goodyear Tire & Rubber Company, Akron, Ohio

[21] Appl. No.: 29,841

[22] Filed: Mar. 11, 1993

[51] Int. Cl.⁵ .......................................... B60C 11/03
[52] U.S. Cl. ............................. 152/209 A; 152/209 R
[58] Field of Search ............ 152/209 R, 209 A, 209 D

[56] References Cited

U.S. PATENT DOCUMENTS

| | | | |
|---|---|---|---|
| 4,953,604 | 9/1990 | Shepler et al. | 152/209 A |
| 4,984,616 | 1/1991 | Shepler et al. | 152/209 A |
| 5,002,109 | 3/1991 | Shepler et al. | 152/209 A |
| 5,176,766 | 1/1993 | Landers et al. | 152/209 R |

FOREIGN PATENT DOCUMENTS

| | | | |
|---|---|---|---|
| 3723368 | 3/1989 | Fed. Rep. of Germany | 152/209 R |
| 2193933 | 2/1988 | United Kingdom | 152/109 R |

OTHER PUBLICATIONS

Automotive Engineering/Oct. 1992, pp. 23–28.

*Primary Examiner*—Geoffrey L. Knable
*Attorney, Agent, or Firm*—Bruce J. Hendricks

[57] ABSTRACT

An improved tire/vehicle system for an automotive vehicle has two pneumatic front tires and two pneumatic rear tires. The rear tire treads and the front tire treads and are each divided circumferentially into first, second, and third zones. The edge between the second and third zone in each front tire is in the center of an aquachannel. The edge between each of the three zones in the rear tires are in the center of an aquachannel. Both the front and rear tires have a tread groove pattern that is asymmetric in character.

7 Claims, 6 Drawing Sheets

TIRE/VEHICLE SYSTEM

BACKGROUND OF THE INVENTION

1. Field of Invention

This invention relates generally to tire/vehicle systems designed for four-wheeled automotive vehicles, and specifically for such systems wherein a portion of the rear tire tread tracks a front tire tread.

2. Description of the Prior Art

In automotive vehicles, proper traction between the tire and the road surface is necessary for effective operation of the vehicle. Under certain weather conditions, such as rain, the traction of the tire on the road surface can be impaired. For example, a vehicle traveling on a rain-soaked road surface at high speed can "hydroplane" and lose contact with the road surface altogether. For this reason, it is desirable that tires be able to channel water away from the footprint of the tire to ensure good traction between the tire and road surface. U.S. Pat. No. 5,176,766 discloses a tire tread designed to provide good traction on slippery road surfaces.

A second problem is that four-wheeled vehicles are usually fitted with identical tires at all four wheel positions even though the operating conditions and performance requirements at each wheel may be different. For example, the functions necessarily performed by each tire, such as steering, load bearing, and transmitting driving torque from the engine to the road surface are usually different at each wheel position.

Some tire designers have sought to maximize vehicle performance by tuning each tire to its wheel position. German Patent 1,480,962 discloses a front and rear tire combination in which the compound in the front tire is different from that in the rear tire, the combination designed to improve treadwear. German Patent 2,536,470 discloses a front and rear tire combination in which the tread pattern on the front tire is varied slightly from the tread pattern on the rear tire to limit the noise generated by the combination. Japanese Patent 58-164360 discloses a front and rear tire combination in which the tread pattern of the front tire differs from that of the rear tire in order to maximize the cornering characteristics of the vehicle.

U.S. Pat. No. 4,984,616 discloses tire/vehicle system for an automotive vehicle. Whereas the use of such tires on dry pavement has met with immense success, there is still unacceptable traction on wet surfaces.

SUMMARY OF THE INVENTION

The invention disclosed and claimed herein is the result of considering the difference in wet road conditions between the front tire and the rear tire and designing the rear tire tread differently from the front tire tread in order to optimize the tire performance in wet conditions.

In a tire/vehicle system according to the invention, the vehicle has two pneumatic front tires and two pneumatic rear tires. The rear tires are wider than the front tires. Each of the tires has a grooved tread. The rear tire treads and the front tire treads are each divided circumferentially into three zones. The front tire is characterized by one aquachannel located in the center of the edge between the second and third zones. The rear tire is characterized by two aquachannels, one aquachannel located in the center of the edge between the fourth and fifth zone and the second aquachannel located between the fifth and sixth zone.

BRIEF DESCRIPTION OF THE DRAWINGS

Other aspects of the invention will become apparent from the following description when read in conjunction with the accompanying drawings wherein.

DESCRIPTION OF THE PREFERRED EMBODIMENTS

Figure 1:
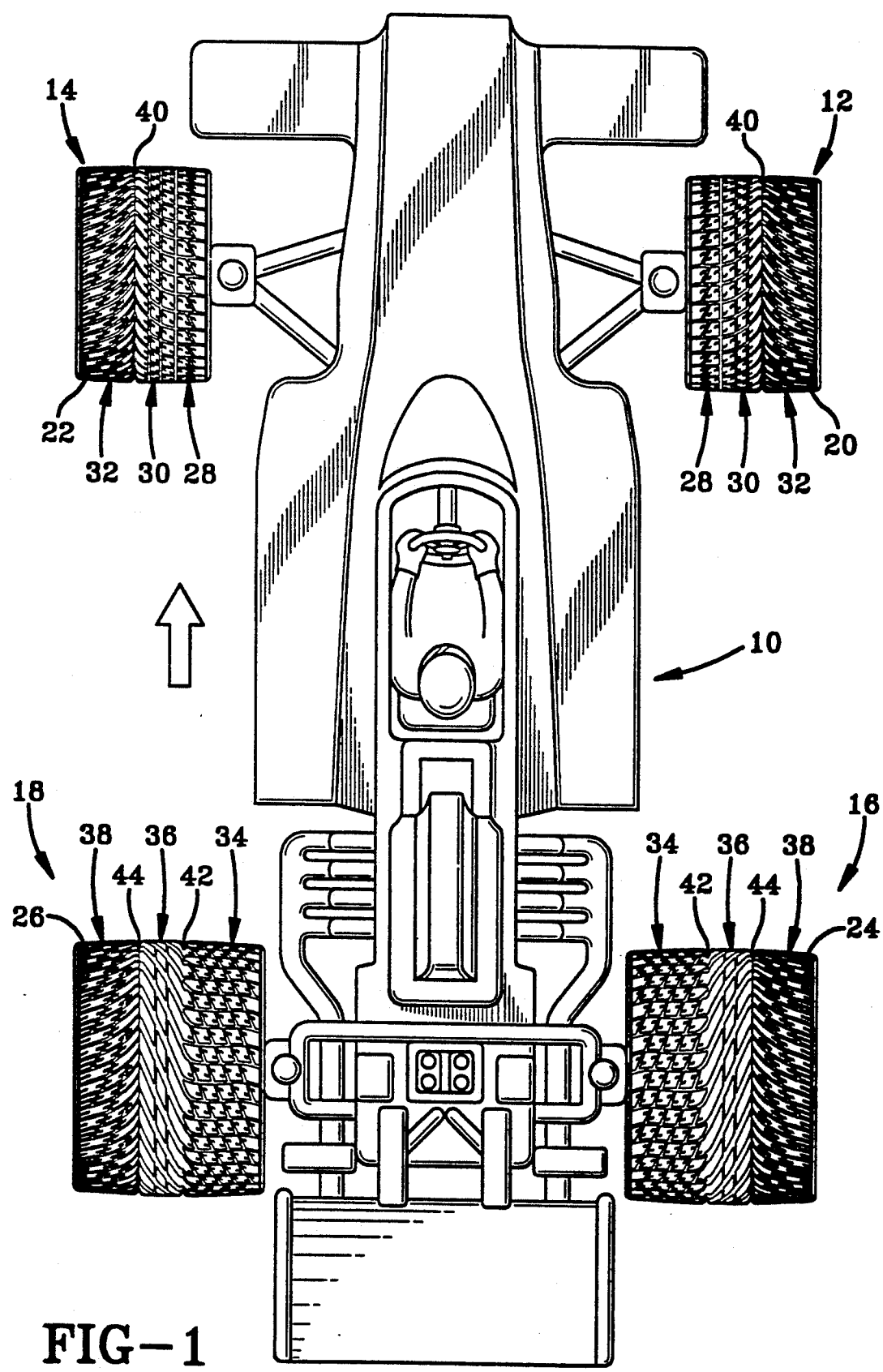
FIG. 1 is a plan view of a tire/vehicle system according to the present invention.

The invention also may be better understood in the context of the following definitions, which are applicable to both the specification and to the appended claims:

"Pneumatic tire" means a laminated mechanical device of generally toroidal shape (usually an open-torus) having beads and a tread and made of rubber, chemicals, fabric and steel or other materials. When mounted on the wheel of a motor vehicle, the tire through its tread provides traction and contains the fluid that sustains the vehicle load.

"Equatorial plane (EP)" means the plane perpendicular to the tire's axis of rotation and passing through the center of its tread.

"Aquachannel" refers to an extra wide circumferential groove with angle (non-parallel), rounded groove walls designed specifically to channel water out of the footprint of the tire.

"Casing" means the carcass, belt structure, beads, sidewalls, and all other components of the tire excepting the tread and undertread. The casing may be new, unvulcanized rubber or previously vulcanized rubber to be fitted with a new tread.

"Tread" means a molded rubber component which, when bonded to a tire casing, includes that portion of a tire that comes into contact with the road when the tire is normally inflated and under normal load.

"Tread width" means the arc length of the tread surface in the axial direction, that is, in a plane passing through the tire's axis of rotation.

"Footprint" means the contact patch or area of contact of the tire tread with a flat surface under normal load and pressure or under specified load, pressure and speed conditions.

"Net-to-gross ratio" means the ratio of the area of the tire tread rubber that makes contact with the road surface while in the footprint, divided by the area of the tread in the footprint, including non-contacting portions such as grooves.

"Tracking" means that in a tire/vehicle system where two tires are mounted on separate axles so that a front tire precedes a rear tire when the vehicle is being normally operated in a straight line, the rear tire contacts the same portions of the road surface as did the front tire.

"Groove" means an elongated void area in a tread that may extend circumferentially or laterally about the tread in a straight, curved, or zigzag manner. Circumferentially and laterally extending grooves sometimes have common portions. The "groove width" is equal to tread surface are occupied by a groove or groove portion, the width of which is in question, divided by the length of such groove or groove portion; thus, the groove width is its average width over its length. Grooves may be of varying depths in a tire. The depth of a groove may vary around the circumference of the tread, or the depth of one groove may be constant but vary from the depth of another groove in the tire. If such narrow or wide grooves are of substantially reduced depth as compared to wide circumferential grooves which they interconnect, they are regarded as forming "tie bars" tending to maintain a rib-like character in the tread region involved.

"Axial" and "axially" are used herein to refer to lines or directions that are substantially parallel to the axis of rotation of the tire.

"Radial" and "radially" are used herein to mean directions radially toward or away from the axis of rotation of the tire.

"Year-round" means a full calendar year through each season. For example, a snow tire is not designed for year-round use since it creates objectionable noise on dry road surfaces and is designed to be removed when the danger of snow is passed.

In the drawings, the same numerals are used for the same components or items in the several views. With particular reference now to FIG. 1, there is illustrated a vehicle 10 according to the present invention.

While the vehicle shown in FIG. 1 is a race car, and the invention was designed primarily for use in racing on wet tracks, the scope of the invention is not limited to race tires and has numerous applications including high performance tires.

With reference to FIG. 1, the vehicle has two front tires 12, 14 and two rear tires 16, 18. Each front tire 12, 14 and each rear tire 16, 18 have an associated tread 20, 22, 24, 26. In the normal mode of operation, the vehicle is driven in the direction of the arrow so that each front tire precedes each rear tire, although the vehicle may be driven in the opposite direction, for example, when parking.

The rear tire 16 is mounted so that at least a portion of the rear tire tread 24 longitudinally tracks at least a portion of the front tire tread 20. In accordance with the present invention each front tire has a first zone 28, a second zone 30 and a third zone 32. The rear tire also has three zones and for purpose of clarity they will be discussed herein as the fourth zone 34, fifth zone 36 and sixth zone 38.

In the front tire 12, the edge between the second zone 30 and the third zone 32 is in the center of an aquachannel 40. In the rear tire 16, the edge between the fourth zone 34 and the fifth zone 36 is in the center of a first aquachannel 42. The edge between the fifth zone 36 and the sixth zone in the rear tire 16 is in the center of an a second aquachannel 44. Preferably, the aquachannel 40 of the front tire 12,14 is circumferentially aligned in the intended direction of travel with the second aquachannel 44 of the rear tire 16,18.

Figure 2:
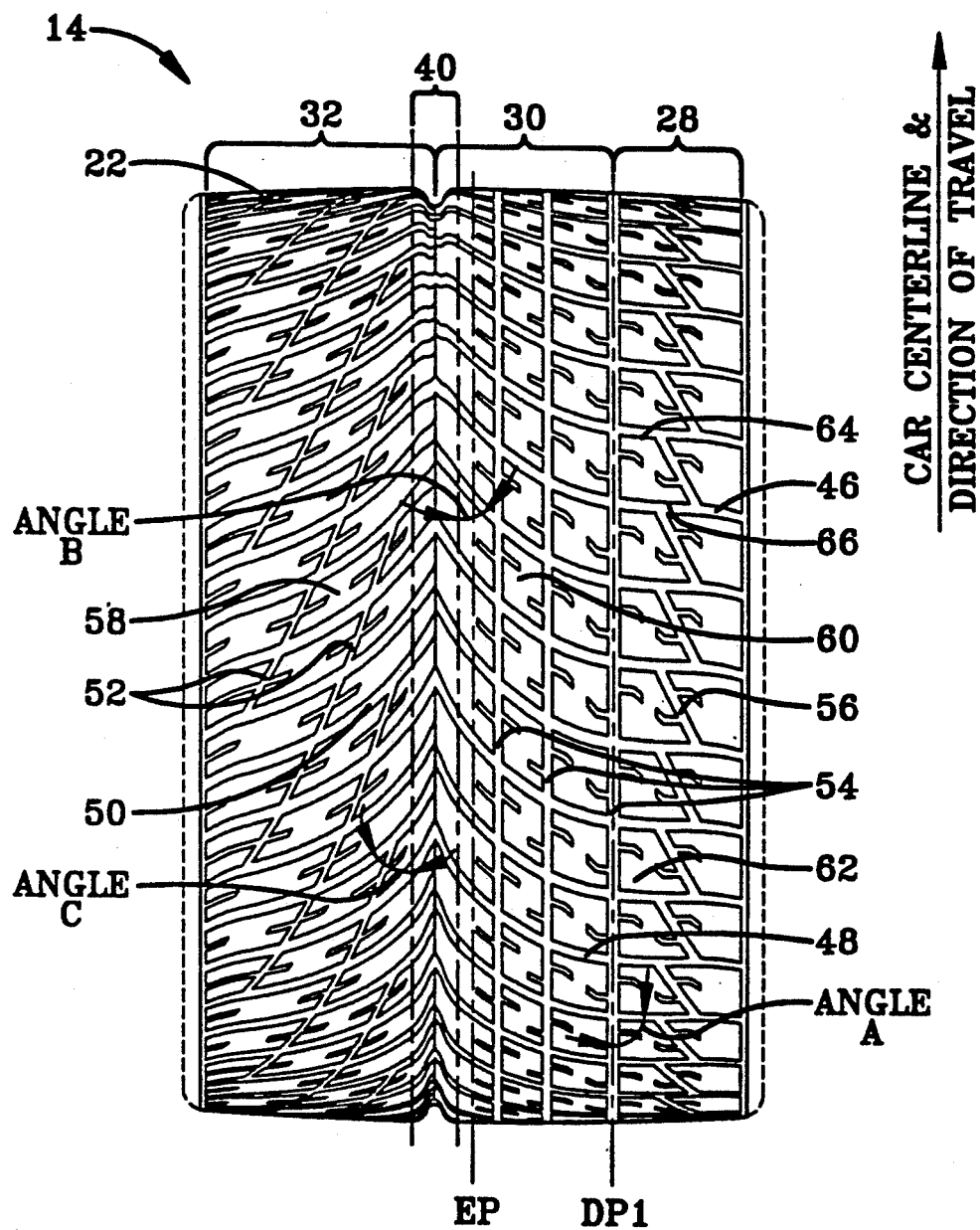
FIG. 2 is a plan view of the left front tire tread of one embodiment of the invention.
Figure 3:
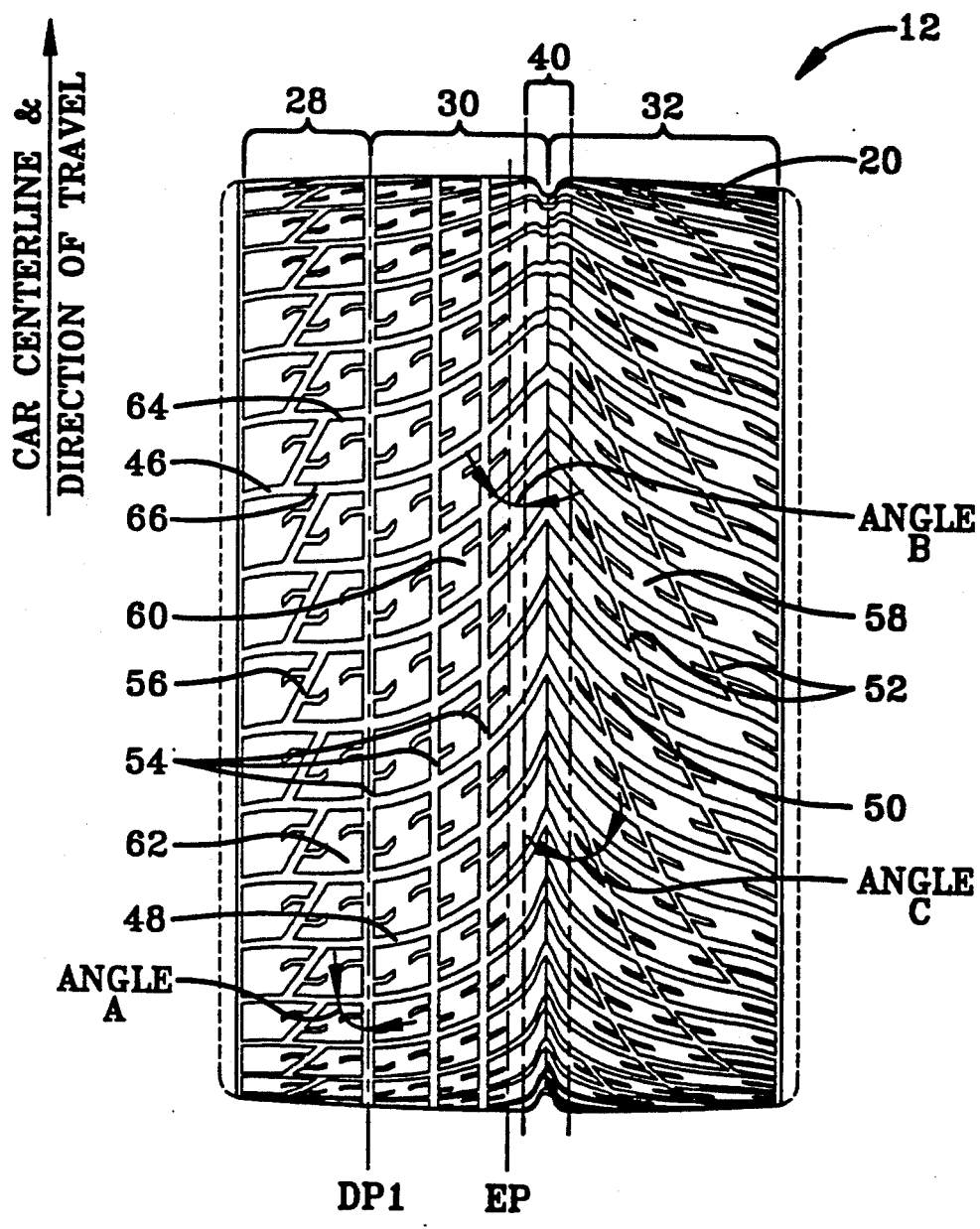
FIG. 3 is a plan view of the right front tire tread of one embodiment of the invention.

With reference to FIGS. 2 and 3, each front tire 12, 14 has a tread 20, 22 which may be formed into a tread pattern to provide certain performance objectives. The front tire tread has first, second and third circumferentially extending zones 28, 30, 32. The first zone 28 is separated from the second zone 30 by a dividing plane DP1. The dividing plane is parallel to the tire's equatorial plane. The edge between the first and second zone and the edges between the second and third zone are parallel to the equatorial plane EP of the front tire. The first zone 28 has a width between 20% and 30% of the front tire width. In the preferred embodiment, the first zone 28 has a width equal to from 22 to 26% of the front tire tread width. The second zone 30 has a width equal to from 30 to 40% of the front tire tread width. Preferably, the second zone 30 has a width equal to from 32 to 36% of the front tire width. The third zone 32 has a width equal to from 38 to 48 percent of the width of the front tire. Preferably, the third zone 32 has a width equal to from 40 to 44% of the width of the front tire. The first zone 28 of the front tire tread 12, 14 has substantially aligned lateral wide groove segments 46 extending across the width of the first zone. The centerlines of these lateral wide groove segments, over a majority of their length in the first zone, form an angle between 70 degrees and 90 degrees, and preferably between 80 and 85 degrees, when measured with respect to a plane located between the first zone and the second zone and which is parallel to the equatorial plane EP and measured in the intended forward direction of travel. See Angle A.

The width in centimeters of the first zone 28, second zone 30 and third zone 32 may vary depending on the size of the tire. For example, the width of the first zone 28 may range from about 4 to 8 centimeters. Preferably, the width of the first zone 28 ranges from about 5 to 7 centimeters. The width of the second zone 30 may range from about 6 to 12 centimeters. Preferably, the width of the second zone 30 may range from about 8 to 10 centimeters. The width of the third zone 32 may range from about 7 to 13 centimeters. Preferably, the width of the third zone ranges from about 9 to 12 centimeters.

The second zone 30 has substantially aligned lateral wide groove segments 48 extending across the width of the second zone 30. The lateral wide groove segments, over a majority of their length in the second zone, have a centerline forming an angle between 25 degrees and 40 degrees, and preferably from 29 degrees to 35 degrees, when measured at the point where the centerline merges with the aquachannel 40 and measured in the intended forward direction of travel. See Angle B. The lateral wide grooves 46 of the first zone 28 merge into the lateral wide grooves 48 of the second zone 30.

The third zone 32 has substantially aligned lateral wide groove segments 50 extending across the width of the third zone 32. The lateral wide groove segments, over a majority of their length in the third zone, have a centerline forming an angle between 25 degrees and 40 degree, and preferably between 30 degrees to 36 degrees, when measured at the point where the centerline merges with the aquachannel 40 and measured in the intended forward direction of travel. See Angle C.

With reference to FIGS. 2 and 3, the front tire tread 12, 14 has other wide grooves 52, 54, 56 which intersect the lateral wide grooves 48, 50 to form blocks 58, 60, 62. The wide grooves 52 in the third zone 32 form an angle between 10 degrees and 35 degrees, and preferably between 14 and 28 degrees, with a plane in the third zone 32 which is parallel to the equatorial plane EP. The other wide grooves 54 in the second zone 30 form an angle between 0 degrees and 10 degrees, preferably 0 degrees, with a plane in the second zone 30, which is parallel to the equatorial plane EP. The wide grooves 56 in the first zone 28 from an angle between 10 degrees and 40 degrees, and preferably between 15 and 30 degrees, with a plane in the first zone 28 which is parallel to the equatorial plane EP.

The blocks 62 in the first zone 28 have a leading edge 64 and a trailing edge 66. The leading edge 64 of the blocks contacts the road surface prior to the trailing edge of such blocks when the tire is rotating in its forward direction. The trailing edge 66 of the blocks 62 in the first zone of the front tire 12, 14 is wider than the leading edge 64 of such blocks. In the preferred embodiment, the front tires are free-rolling, as opposed to driven, and are the most important tires for braking. The trailing edge of the blocks assist in improving longitudinal traction during deceleration.

Tread designs utilized on the front tire tread 12, 14 which utilize an aquachannel 40 tend to disperse water from the footprint to the shoulder area of the tire to help prevent hydroplaning.

Figure 4:
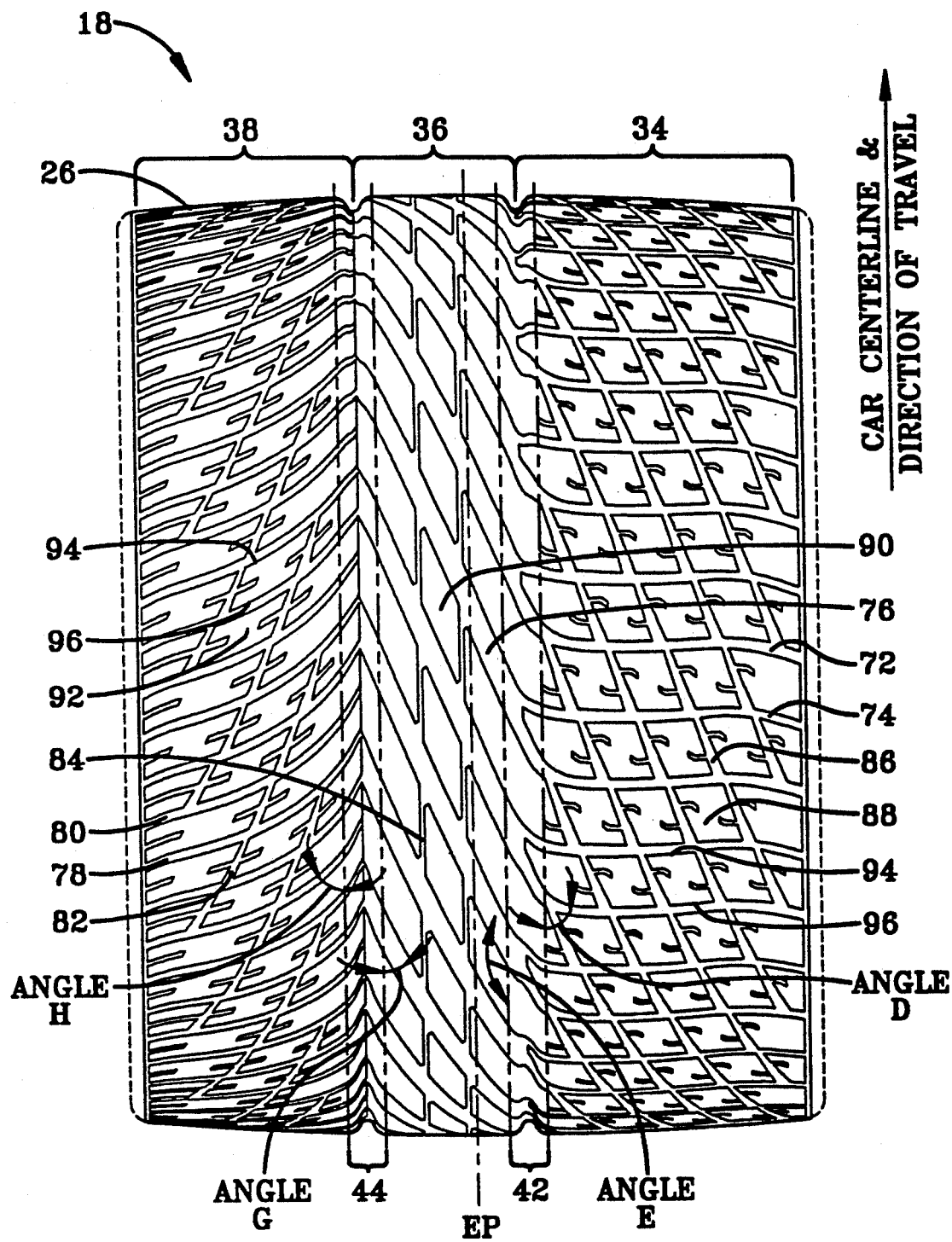
FIG. 4 is a plan view of the left rear tire tread of one embodiment of the invention.
Figure 5:
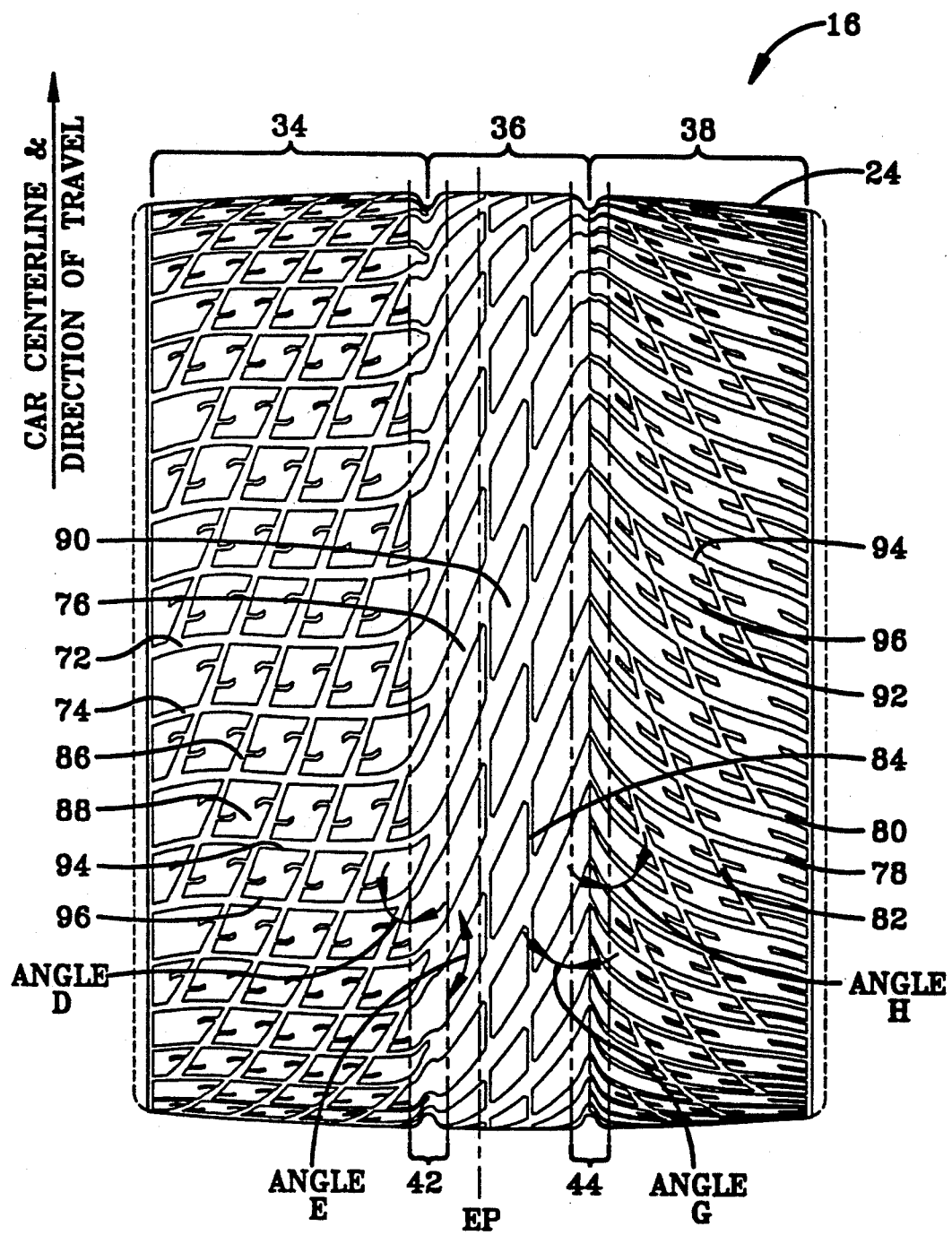
FIG. 5 is a plan view of the right rear tire tread of one embodiment of the invention.

With reference to FIGS. 4 and 5, the rear tire tread 16, 18 is characterized by three circumferentially extending zones 34 (the fourth zone), 36 (the fifth zone), 38 (the sixth zone). In that the three zones of the first tire are designated first, second and third zone, the three zones of the rear tire are designated herein as the fourth 34, fifth 36 and sixth 38 zones. The fourth, fifth and sixth zones 34, 36, 38 of the rear tire 16, 18 extend circumferentially about the tire so that the edges of the zones are parallel to the equatorial plane EP of the rear tire and the fifth zone 36 is disposed between the fourth zone 34 and the sixth zone 38. The edge between the fourth zone 34 and the fifth zone 36 is in the center of a first aquachannel 42. The edge between the fifth zone 36 and the sixth zone 38 is in the center of a second aquachannel 44.

The width of the fourth zone 34 is between 35% and 48% of the tread width of the rear tire 16, 18. Preferably, the width of the fourth zone 34 is between 40 and 45%. The width of the fifth zone 36 is between 20% and 30% of the tread width of the rear tire. Preferably, the width of the fifth zone 36 is between 22% and 27%. The width of the sixth zone 38 is between 25% and 40% of the tread width of the rear tire. Preferably, the width of the sixth zone 38 is between 30 and 36%.

The width in centimeters of the fourth zone 34, fifth zone 36, and the sixth zone 38 may vary depending on the size of the tire. For example, the width of the fourth zone 34 may range from about 10 to 18 centimeters. Preferably, the width of the fourth zone 34 ranges from about 12 to 16 centimeters. The width of the fifth zone 36 may range from about 4 to 12 centimeters. Preferably, the width of the fifth zone 36 ranges from 6 to 10 centimeters. The width of the sixth zone may range from about 6 to 15 centimeters. Preferably, the width of the sixth zone 38 ranges from about 9 to 13 centimeters.

The fourth zone 34 has substantially aligned lateral wide groove segments 72, 74 which extend across the width of the fourth zone 34. These lateral wide groove segments have center lines which form angles between 30 degrees and 80 degrees when measured at the point when it merges with the first aquachannel 42 and measured in the intended forward direction of travel. See Angle D. Preferably, these lateral wide groove segments have centerlines which form angles between 40 degrees an 75 degrees.

The fifth zone 36 has a plurality of wide groove segments 76 laterally extending from the first aquachannel 42 across the fifth zone 36 to the second aquachannel 44. The lateral wide groove segments 76 of the fifth zone 36 have centerlines which form an angle of between 155 degrees and 170 degrees at the point when it merges with the first aquachannel 42, See Angle E and an angle of from between 10 degrees and 25 degrees at the point when the wide grooves 76 merge with the second aquachannel 44, See Angle G. Preferably, the wide groove segments 76 in the fifth zone 36 have centerlines which form an angle of between 157 degrees and 163 degrees at the point where the centerline merges with the first aquachannel 42 and an angle of between 17 degrees and 23 degrees where the centerline merges with the second aquachannel 44.

The sixth zone 38 has a plurality of laterally extending wide groove segments 78 extending axially outward from said second aquachannel 44 across the width of the sixth zone 38 to the nearest tread edge 80. Each laterally extending wide groove 78 in the sixth zone 38 is oriented such that the centerline of the groove 78 forms an angle between 25 degrees and 40 degrees at the point where it merges with the second aquachannel 44 and measured in the intended forward direction of travel. See Angle H. Preferably, the angle is between 30 degrees and 36 degrees. The primary purpose of the fourth zone 34 is longitudinal traction during acceleration. The primary purpose of the sixth zone 38 is lateral traction for cornering and to prevent sliding. The nearly perpendicular relationship between the grooves 76 of the fifth zone 36 is designed to inhibit lateral sliding of the rear tires 16, 18 during turns while continuing to provide good longitudinal traction for acceleration.

The rear tire tread has other wide groove segments 82, 84, 86 which intersect the lateral wide groove segments 72, 74, 76, 78 to form blocks 88, 90, 92. The blocks in the fourth zone 34 and sixth zone 38 have a leading edge 94 and a trailing edge 96. The leading edge 94 of the blocks contacts the road surface prior to the trailing edge of the blocks when the tire is rotating in its forward direction. The leading edge of the blocks in the fourth zone 34 and the sixth zone 38 are wider than the trailing edge of the blocks in the fourth zone 34 and the sixth zone 38. In the preferred embodiment, the rear tire is driven and the leading edge of the blocks assist in improving longitudinal traction during acceleration. The blocks in the fourth zone 34 are shaped like trapezoids and the blocks in the fifth zone 36 and sixth zone 38 are shaped like parallelograms.

Figure 6:
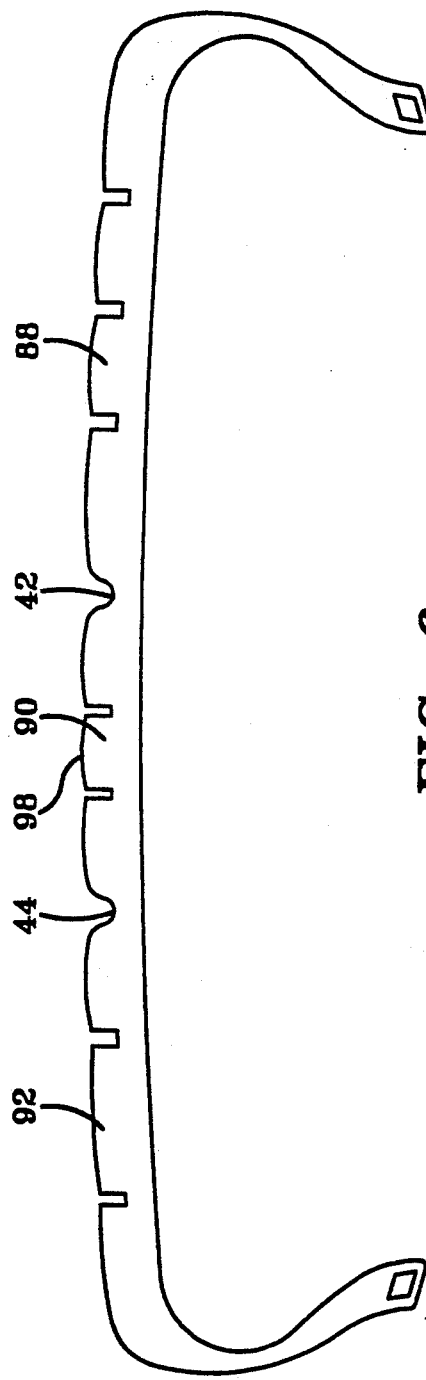
FIG. 6 is a cross-sectional view of a rear tire according to one embodiment of the invention.
Figure 7:
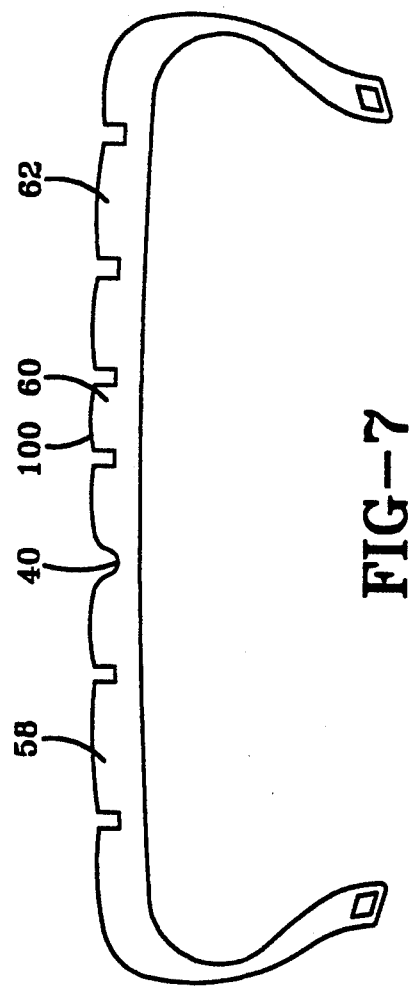
FIG. 7 is a cross-sectional view of a front tire according to one embodiment of the invention.

With reference to FIGS. 1–7, the front and rear tires are further characterized by varying net-to-gross ratios in each of the zones. The tread's net-to-gross ratio must be low enough to ensure that the tread's void areas can accommodate any water on the road surface. With reference to FIG. 6, when the two aquachannels 42, 44, grooves and other void areas are properly sized, as the tire enters the footprint, water is channeled out of the footprint by the void areas, enabling the radially outermost surface 98 of the tread blocks 88, 90, 92 to make contact with the road surface. If the void areas are too small, a portion of the water is trapped between the blocks and the road surface. This results in unacceptable tire traction and vehicle handling. With reference to FIG. 7, when the single aquachannel 40, grooves and other void areas are properly sized, water is channeled out of the footprint by the void areas enabling the radially outermost surface 100 of the tread blocks 58, 60, 62 to make contact with the road surface. The radially outermost surface 98, 100 of the blocks are convexly curved in the radially outward direction. In the preferred embodiment, this curvature is in the axial direction only; the circumferential direction has no curvature apart from the usual curvature associated with a round tire. The curvature of the surface of the element helps move water from the center of the block to the tread groove. The curvature shown in FIGS. 6 and 7 is exaggerated for clarity. This crowning helps prevent water being trapped between the block and the road surface.

On the other hand, if the tire tread has a net-to-gross ratio that is too low, tire traction, especially peak traction, and treadwear will be lowered. With reference to FIGS. 2-5, in a tire tread with a low net-to-gross ratio, the blocks 58, 60, 62, 88, 90, 92 of the tread must bear a correspondingly greater percentage of the vehicle load. This higher loading of individual tread blocks lowers the treadwear of the tire. Additionally, blocks in a low net-to-gross ratio tread deflect more due to the higher loading. This additional deflection is undesirable for handling, especially under hard cornering.

The front tire of the present invention have three zones which vary in their net-to-gross ratios. The first zone 28 of the front tire 12, 14 tread has a net-to-gross ratio between 65 and 75% with the preferred net-to-gross ratio ranging from 68 to 72%. The net-to-gross ratio of the second zone 30 of the front tire 12, 14 tread is between 54% and 64% with the net-to-gross of from about 56 to 59% being preferred. Preferably, the net-to-gross ratio of the second zone 36 is at least 5% less than the net-to-gross ratio of the first zone 28. The third zone 32 of the front tire 12, 14 has a net-to-gross ratio between 54 and 64 percent. Preferably, the net-to-gross ratio of the third zone ranges from about 56 to 61%.

The net-to-gross ratios of the individual zones in the rear tire may vary. In tires according to the preferred embodiment, the net-to-gross ratio of each zone in the rear tire is different from the other zones in such tire. The fourth zone 34 of a rear tire 16, 18 according to the present invention has a net-to-gross between 55% and 70%, with the preferred embodiment being from 60 to 65%. The fifth zone 36 of a rear tire 16, 18 has a net-to-gross ratio between 38% and 48%, with the currently preferred embodiment ranging from 40 to 45%. The sixth zone 38 of a rear tire according to the present invention has a net-to-gross ratio between 50% and 66%, with the preferred net-to-gross ratio ranging from 55% to 62%.

What is claimed is:

1. An improved tire/vehicle system designed for year-round or high speed use as an automotive passenger vehicle on paved road surfaces, the vehicle having two pneumatic front tires mounted thereon and two pneumatic rear tires mounted thereon, each said tire having a tread with grooves thereon, at least a portion of the tread of each rear tire tracking one of the front tires, the net-to-gross ratio of each tread of each rear tire being at least 2 percent less than that of the tread of the front tire that it tracks;
    (a) each said front tire comprising first, second and third circumferentially extending zones, the zones having edges which are parallel to the equatorial plane of the front tire, said edge between the second and third zone being in the center of an aquachannel,
        (1) said first zone having a width of between 20 to 30 percent of the width of the front tire tread, said first zone having a net-to-gross ratio between 65 and 75 percent and a width between 4 and 8 centimeters with substantially aligned lateral wide groove segments extending thereacross, and along a majority of its length in the first zone each lateral wide groove having a centerline which forms an angle between 70° and 90° with respect to a plane located between the front zone and second zone and parallel to the equatorial plane of the front tire;
        (2) the second zone having a width of between 30 to 40 percent of the width of the front tire tread, said second zone having a net-to-gross ratio between 54 percent and 64 percent and width between 6 and 12 centimeters with substantially aligned lateral wide groove segments extending thereacross, and along the majority of its length in the second zone, each lateral wide groove having a centerline being oriented such that the centerline forms an angle of between 25 degrees and 40 degrees at the point where the centerline merges with the aquachannel and the groove continues to merge into the lateral wide grooves of the first zone;
        (3) said third zone having a width of between 38 to 48 percent of the width of the front tire tread, said third zone having a net-to-gross ratio between 54 and 64 percent and substantially laterally extending grooves extending thereacross outward from said aquachannel to the nearest tread edge, each laterally extending groove having a centerline which is oriented such that the centerline forms an angle of between 25 degrees and 40 degrees at the point where the centerline merges with the aquachannel;
    (b) each rear tire tread comprising fourth, fifth, and sixth circumferentially extending zones, said zones having edges which are parallel to the equatorial plane of the tire and said edge between the fourth zone and fifth zone is in the center of a first aquachannel and said edge between the fifth zone and sixth zone is in the center of a second aquachannel, the fifth zone being disposed between the fourth zone and the sixth zone,
        (1) said fourth zone having a width of between 35 percent and 48 percent of the width of said rear tire tread, said fourth zone having a net-to-gross ratio between 55 percent and 70 percent, a plurality of substantially laterally extending wide grooves extending inward from said first aquachannel to the nearest tread edge, each laterally extending wide groove having a centerline being oriented such that the centerline forms an angle of between 30 degrees and 80 degrees at a point where the centerline merges with the first aquachannel;
        (2) the width of the fifth zone being between 20 and 30 percent of the width of said rear tire tread, said fifth zone having a net-to-gross ratio between 38 percent and 48 percent, a plurality of wide grooves laterally extending from said first aquachannel across said fifth zone to the second aquachannel, said wide grooves in the fifth zone having a centerline being oriented such that the centerline forms an angle of between 155 degrees to 170 degrees at the point the centerline merges with the first aquachannel and an angle of from between 10 degrees to 25 degrees at the point where the centerline merges with said second aquachannel;

(3) the width of the sixth zone being between 25 and 40 percent of the width of said rear tread and having a net-to-gross ratio between 50 percent and 66 percent with a plurality of laterally extending wide groove segments extending axially outwardly from said second aquachannel to the nearest tread edge, each laterally extending wide groove having a centerline being oriented such that the centerline forms an angle between 25° and 40° at the point where the centerline merges with the second aquachannel.

2. The improved tire/vehicle system of claim 1 wherein the aquachannel of said front tire is aligned with the second aquachannel of the rear tire.

3. The improved tire/vehicle system of claim 1 wherein the net-to-gross ratio of the first zone ranges from 68% to 72%, the net-to-gross ratio of the second zone ranges from 56% to 59%, the net-to-gross ratio of the third zone ranges from 56% to 61%, the net-to-gross ratio of the fourth zone ranges from 60% to 65%, the net-to-gross ratio of the fifth zone ranges from 40% to 45%, and the net-to-gross ratio of the sixth zone ranges from 55% to 62%.

4. The improved tire/vehicle system of claim 1 wherein said first zone has a width of between 22 to 26 percent of the width of the front tire tread, said second zone has a width of between 32 to 36 percent of the width of the front tire tread, said third zone has a width of between 40 to 44 percent of the width of the front tire tread, said fourth zone has a width of between 40 to 45 percent of the width of the rear tire tread, said fifth zone has a width of between 22 to 27 percent of the width of the rear tire tread, and said sixth zone has a width of between 30 to 36 percent of the width of the rear tire tread.

5. The improved tire/vehicle system of claim 1 wherein said lateral wide grooves in the first zone have a centerline which forms an angle of between 80 degrees and 85 degrees with respect to a plane parallel to the equatorial plane of the front tire, each lateral wide groove in the second zone having a centerline being oriented such that the centerline forms an angle of between 29 degrees and 35 degrees, each lateral wide groove in the third zone having a centerline being oriented such that the centerline forms an angle of between 30 degrees and 36 degrees, each lateral wide groove in the fourth zone having a centerline being oriented such that the centerline forms an angle of between 40 degrees and 75 degrees, each lateral wide groove in the fifth zone having a centerline being oriented such that the centerline forms an angle of between 157 degrees and 163 degrees at the point where the centerline merges with the first aquachannel and an angle of between 17 degrees and 23 degrees where the centerline merges with the second aquachannel, and each lateral wide groove in the sixth zone having a centerline being oriented such that the centerline forms an angle of between 30° and 36° at the point where the centerline merges with the second aquachannel.

6. The improved tire/vehicle system of claim 1 wherein each said rear tire has wide groove segments in the fourth and sixth zone which intersect said laterally extending wide grooves to form blocks having leading and trailing edges, the leading edges of the blocks in the fourth and sixth zone being wider than the trailing edges of the blocks of the fourth and sixth zone.

7. The improved tire/vehicle system of claim 1 wherein the width of the first zone ranges from about 5 to 7 cm., the width of the second zone ranges from 8 to 10 cm., the width of the third zone ranges from 9 to 12 cm., the width of the fourth zone ranges from 12 to 16 cm., the width of the fifth zone ranges from 6 to 10 cm., and the width of the sixth zone ranges from 9 to 13 cm.

* * * * *